F. BURGDORF.
POTATO DIGGER.
APPLICATION FILED MAR. 18, 1912.
1,051,552.
Patented Jan. 28, 1913.
2 SHEETS—SHEET 1.
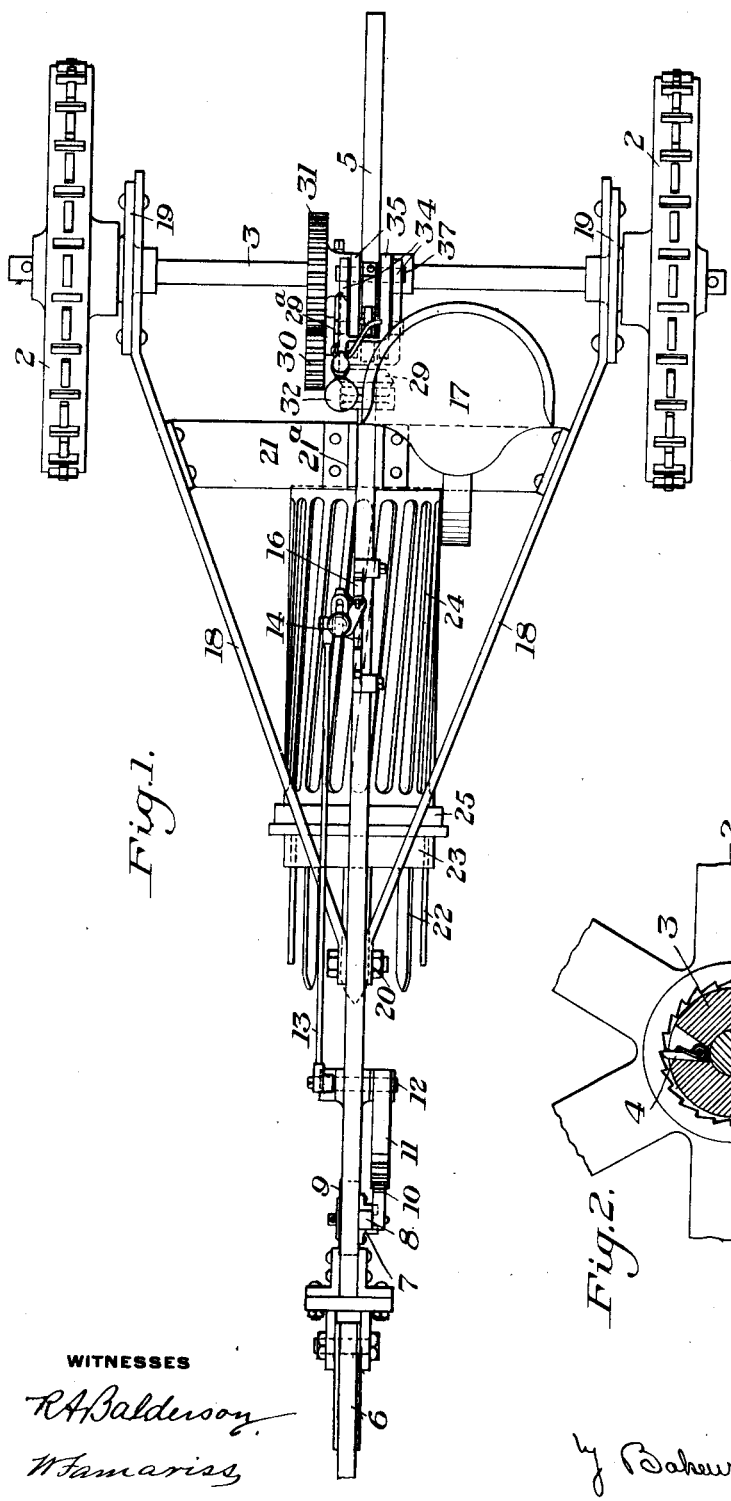
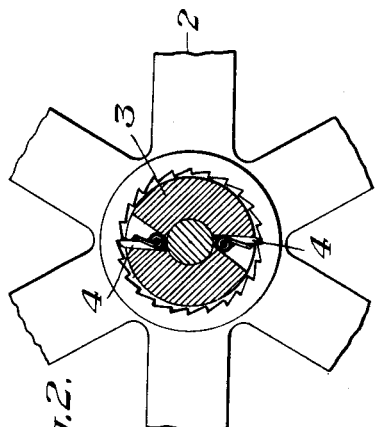
WITNESSES
INVENTOR

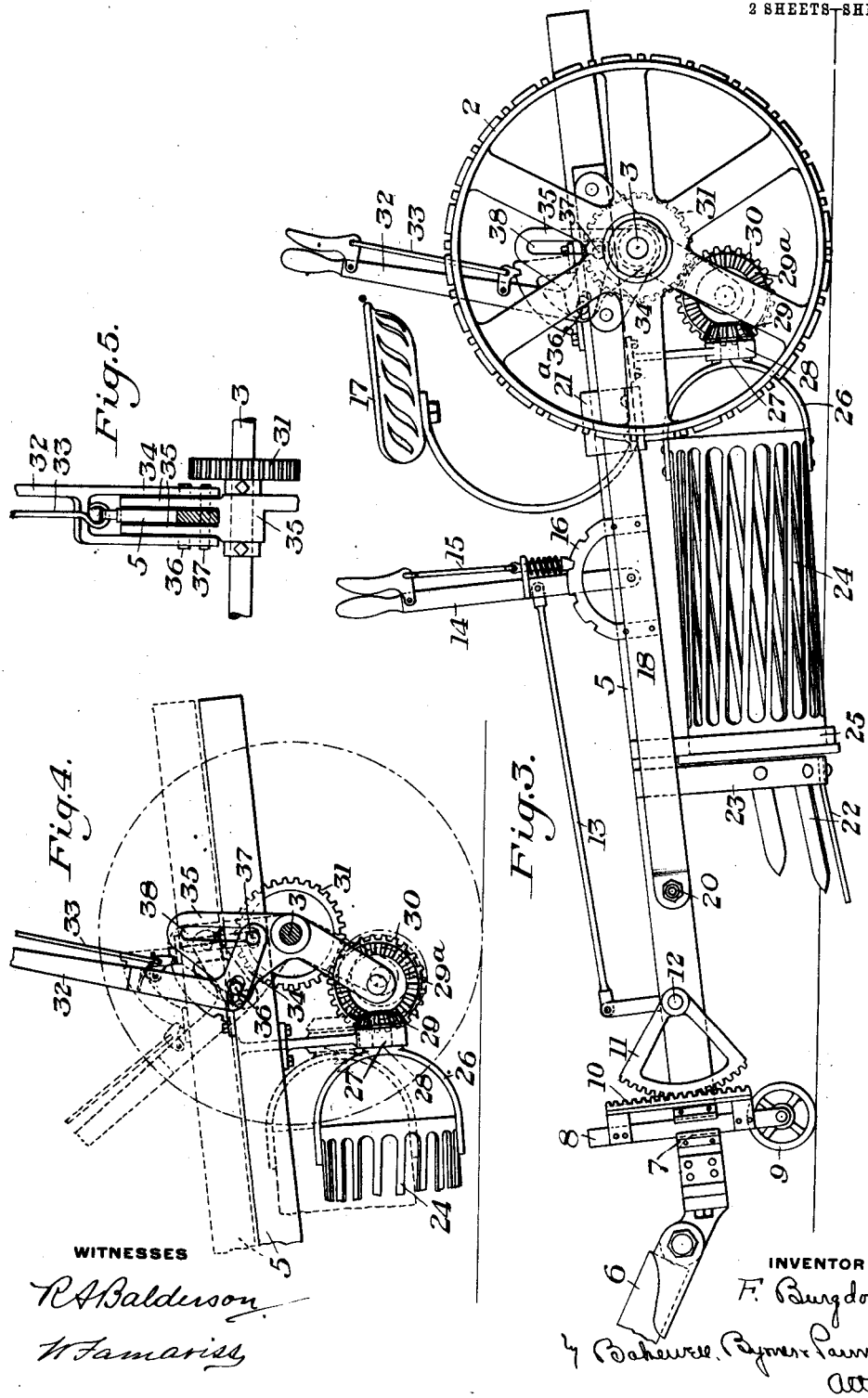

UNITED STATES PATENT OFFICE.

FREDERICK BURGDORF, OF LORAIN, OHIO.

POTATO-DIGGER.

1,051,552.  Specification of Letters Patent.  Patented Jan. 28, 1913.

Application filed March 18, 1912. Serial No. 684,440.

*To all whom it may concern:*

Be it known that I, FREDERICK BURGDORF, of Lorain, Lorain county, Ohio, have invented a new and useful Improvement in Potato-Diggers, of which the following is a full, clear, and exact description, reference being had to the accompanying drawings, forming part of this specification, in which—

Figure 1 is a plan view of a potato digger embodying my invention; Fig. 2 is a detail sectional view showing the driving connection between one of the main wheels and the axle; Fig. 3 is a side elevation of the machine; Fig. 4 is a detail side view showing certain parts of the machine; and Fig. 5 is a sectional detail view hereinafter more particularly referred to.

My invention has relation to potato diggers, and is designed to provide a simple and effective machine which can be constructed at a comparatively small cost.

A further object of my invention is to provide a machine of this character having novel means for raising the operative parts and throwing them out of gear when the machine is traveling across fields or is turning roads.

A still further object of my invention is to so support the separating drum, that the front end thereof is unobstructed to permit the potatoes and soil to freely enter the drum from the plow, and to so locate the separating drum that the operator can see the rear end thereof and observe the potatoes, etc., dropping thereupon without turning in his seat.

The nature of my invention will be best understood by reference to the accompanying drawings, in which I have shown the preferred embodiment thereof, and which will now be described, it being premised, however, that the invention is susceptible of various changes within the spirit and scope of the appended claims.

In these drawings, the numeral 2 designates the main supporting wheels, which are loosely journaled on an axle 3. The wheels 2 have a driving connection with the axles 3 when turning in a forward direction by means of suitable internal pawl and ratchet devices arranged in the hub thereof, as shown at 4 in Fig. 2. When the wheels 2 turn in a backward direction, as in backing or turning the machine, the ratchet pawls will slip idly over the teeth so that there will be no rotation of the axle.

Extending longitudinally of the machine above the axle 3, and forwardly and rearwardly thereof, is a frame bar 5, which at its forward end is provided with a suitable draft connection 6 and also has guides 7 for a vertically movable post 8, which carries a small central front supporting gage wheel 9. The post 8 and wheel 9 are arranged to be raised and lowered by any suitable mechanism, such as the rack bar 10, which is attached to the post 8 and whose teeth are engaged by the teeth of a segment 11 to determine the position of the plow or digger when the device is in operation. This segment is pivoted to the bar 5 at 12, and has an operating connection 13 extending rearwardly to a hand lever 14. The hand lever is provided with a spring locking pawl 15, coöperating with a notched rack 16 secured to the bar 5. The lever 14 is arranged within convenient reach of the operator's seat 17.

18 designates forwardly converging braces, which, at their rear ends carry bearings 19 for the axle 3, and which are pivotally connected at their front ends at 20 to the bar 5. 21 is a cross bar connecting the braces 18 forward of the axle 3, and is provided with guides 21ª for the bar 5. The seat is supported on the cross bar 21, and is located at one side of the longitudinal center of the machine.

22 designates digger blades, which are carried on the depending frame member 23 secured at its upper ends to the bar 5, and which are set at an angle so as to enter the ground at an angle thereto to the desired depth. This depth can be changed by raising or lowering the supporting wheel 9 through the means before described. At the rear of the digger blades 22, is a perforated separating or cleaning drum 24, journaled at its forward end in a strap bearing 25 which depends from the bar 5, in such a manner as to leave the front opening unobstructed. Secured to its rear end is a yoke or bail 26 carrying a journal 27 mounted in a bearing 28 depending from the bar 5 in advance of the axle 3. The rear end of the drum is in advance of the operator's seat 17. Attached to the journal portion of the bail 26 is a bevel gear wheel 29 whose teeth mesh with a bevel pinion 29ª having an attached spur gear 30 which is driven by a spur pinion 31 on the axle 3.

The potatoes are removed from the ground by the digger blades 22, and are carried backwardly into the rotating drum 24, some of the dirt, stones, etc., falling through the longitudinally disposed slots, and the remainder being dropped out through the openings of said drum. The potatoes are discharged at the open rear end of the drum on the surface of the ground.

When it is desired to raise the digger blades out of digging position and to also stop the rotation of the drum 24, as in going across fields, or in turning roads, the wheel 9 is lowered to raise the digger blades out of the ground. The beam 5 is then raised to further raise the attached digger blades and the drum 24, and at the same time the bevel gear 29 is thrown out of gear by the means now to be described. This means comprises a lever 32, which is in convenient reach of the driver's seat, and is provided with a locking pawl 33. This lever has a forked and angled lower end portion 34, which embraces the bar 5 and also embraces a forked bracket or frame member 35 which is sleeved on the axle 3, the bar 5 extending through the fork of this bracket member as shown in Fig. 5. The forked lower portion of the lever is pivoted on a pin 36 carried by the bracket member 35, the lever having a slotted engagement with said pin. The free end of the forked portion of the lever also carries pins 37 which are arranged to move in the slot 38 in the upwardly projecting fork arms of the bracket member 35. The lower portion of the slots 38 are slightly offset forwardly to normally be engaged by the pins 37. When it is desired to raise the digger blades and to throw the drum out of operation, the lever 32 is moved forwardly, this initial movement carrying the pins 37 out of the offset portions of the slots 38 and at the same time swinging the lower portion of the bracket member 35, in which the gears 29 and 30 are carried rearwardly a sufficient distance to disengage the beveled gears 29 and 29ª. Further forward movement of the lever 32 effects the elevation of the rear of the bar 5 to further raise the digger blades 22 and drum 24 to the position shown in dotted lines in Fig. 4.

The advantages of my invention result from the provision of a rotatable cleaning drum located in advance of the operator's seat so that he can observe the operation of the device without turning in his seat. Further, from the provision of means for journaling the front end of the separating drum without obstructing the opening thereto. Also from the provision of gearing for actuating said drum, together with means for simultaneously raising the drum and disconnecting the driving gears.

I claim:—

1. A potato digger having an axle with supporting wheels mounted thereon, a main frame journaled on the axle, an auxiliary frame pivotally connected to the front end of the main frame, a digger mounted on the auxiliary frame, a rotary separating drum supported on the auxiliary frame at the rear of the digger, a driving gear connected to the drum, gearing mounted on the axle and connected to the gear on the drum, and means for raising the auxiliary frame and swinging the gears on the axle to raise the drum and disconnect the gears from the drum; substantially as described.

2. A potato digger having an axle with supporting wheels mounted thereon, a main frame journaled on the axle, an auxiliary frame pivotally connected to the front end of the main frame, a digger mounted on the auxiliary frame, a rotary separating drum supported on the auxiliary frame at the rear of the digger, a driving gear connected to the drum, a bracket pivotally mounted on the axle and connected to the main frame, a gear wheel connected to the axle, gear wheels mounted on said bracket meshing with the gear wheel on the drum and the gear wheel on the axle to drive the drum, and means to swing said bracket to disconnect the gears and raise the auxiliary frame; substantially as described.

3. A potato digger having an axle with supporting wheels mounted thereon, a main frame journaled on said axle, an auxiliary frame pivoted to the main frame, a digger connected to the auxiliary frame, a revolving drum open at both ends journaled on the auxiliary frame to the rear of said digger, a gear wheel connected to said drum, a gear wheel connected to the shaft, a bracket pivotally connected to the shaft, gearing journaled in said bracket for connecting the gear on the drum to the gear on the shaft, and a lever connected to the auxiliary frame, for shifting said bracket with relation to the main frame and auxiliary frame to disconnect the gearing from the driving gear on the frame; substantially as described.

4. A potato digger having an axle with supporting wheels mounted thereon, a main frame journaled on the axle, an auxiliary frame pivoted to the main frame, a revolving drum journaled on the auxiliary frame, a gear wheel connected to the drum, a gear wheel connected to the shaft, a bracket pivoted to the shaft and connected to the auxiliary frame, gearing journaled on said bracket connecting the gear wheel on the shaft with the gear wheel on the drum, and adjusting mechanism for shifting said bracket to disconnect the driving gear from the gear on the drum; substantially as described.

In testimony whereof, I have hereunto set my hand.

F. BURGDORF.

Witnesses:
 JESSE B. HELLER,
 H. M. CORWIN.